(12) United States Patent
Jaye et al.

(10) Patent No.: US 9,189,650 B2
(45) Date of Patent: Nov. 17, 2015

(54) PRIVACY PRESERVING METHOD FOR SUMMARIZING USER DATA

(71) Applicant: J. D. Power and Associates, Westgate Village, CA (US)

(72) Inventors: Daniel Jaye, Winter Garden, FL (US); James Q Secretan, Winter Garden, FL (US)

(73) Assignee: J.D. Power and Associates, Westlake Village, CA (US)

( * ) Notice: Subject to any disclaimer, the term of this patent is extended or adjusted under 35 U.S.C. 154(b) by 123 days.

(21) Appl. No.: 13/953,233

(22) Filed: Jul. 29, 2013

(65) Prior Publication Data

US 2014/0041047 A1    Feb. 6, 2014

Related U.S. Application Data

(60) Provisional application No. 61/677,499, filed on Jul. 31, 2012.

(51) Int. Cl.
*H04L 29/06* (2006.01)
*G06F 21/62* (2013.01)

(52) U.S. Cl.
CPC ........ *G06F 21/6245* (2013.01); *G06F 21/6254* (2013.01); *G06F 21/6263* (2013.01); *H04L 63/0407* (2013.01)

(58) Field of Classification Search
CPC ............ G06F 21/6245; G06F 21/6254; G06F 21/6263; G06F 17/30289; G06F 17/30; H04L 63/0407
See application file for complete search history.

(56) References Cited

U.S. PATENT DOCUMENTS

2013/0031367 A1*    1/2013    Mao et al. .................... 713/168

* cited by examiner

*Primary Examiner* — Izunna Okeke
(74) *Attorney, Agent, or Firm* — Proskauer Rose LLP

(57) ABSTRACT

A method includes, in a server residing in a network of interconnected computers, receiving user data, dissecting the received user data into a plurality of key/value pairs, iterating through the plurality of key/value pairs, generating a new data structure in the memory of the server for each key/value pair that do not exist, inserting a UserID into a set associated for a specific key/value pair, storing the key/value sets, and destroying the received user data.

56 Claims, 6 Drawing Sheets

200

Receive a list of columns
202

↓

Iterate through the tags
204

↓

Gather a set
206

↓

Calculate all possible
combinations of values
for each key
208

↓

Look up the corresponding
set data structures
210

↓

Intersect these sets
212

Create Bloom filter for each type of
UserID to analyze
502

Receive user data, including two
or more types of UserIDs
504

Estimate the cardinality of each Bloom filter by
counting bits set
506

Use ratio cardinality estimates to correct unique
count reports of frequently changing UserIDs
508

Create new Bloom filter
data structure for opt-out events
602

Receive user opt-out with UserID
604

Insert UserID into opt-out Bloom filter
606

Remove the UserID from all of the
counting Bloom filters from the key/value sets
608

Receive new user data
610

When user data comes in,
check the UserID against opt-
out data structure. If it is in
the structure, discard the
data.
612

PRIVACY PRESERVING METHOD FOR SUMMARIZING USER DATA

BACKGROUND OF THE INVENTION

The invention relates generally to systems and methods for analyzing user data, and more particularly to a privacy preserving method for summarizing user data.

Organizations, both public and private, have access to substantial amounts of electronically stored data about users. This data is often sensitive and must be kept secure to protect the privacy of the user. However, despite the best efforts of many organizations, data is regularly lost or stolen. Even when it is kept secure, it can be subpoenaed in both criminal and civil cases. And there is an increasing threat that intelligence organizations will undertake "fishing expeditions" where they monitor user data for suspicious activity, without probable cause. Due to the many laws governing the protection of personal identification information and additional security required, vendors do not wish to capture and store such information when not required. All of these threats to privacy have the potential to make users uncomfortable sharing or storing data.

At the same time threats to privacy are becoming an increasing concern, the potential to leverage user data has never been greater. User data is valuable for applications as diverse as engineering, medicine and advertising. One common type of analysis that is done on user data involves finding the number of users with a particular combination of attributes, on a summary basis. For instance, an advertising company may want to know how many users saw an ad and took a particular action online. Or a health maintenance organization (HMO) may want to know how many patients who took a particular drug also had elevated liver enzyme levels.

What is needed is a method for summarizing user data that preserves privacy.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for a privacy preserving method of summarizing user data.

In one aspect, the invention features a method including, in a server residing in a network of interconnected computers, receiving user data, dissecting the received user data into a plurality of key/value pairs, iterating through the plurality of key/value pairs, generating a new data structure in the memory and/or persistent storage of the server for each key/value pair that do not exist, inserting a UserID into a set associated for a specific key/value pair, storing the key/value sets, and destroying the received user data.

Other features and advantages of the invention are apparent from the following description, and from the claims.

BRIEF DESCRIPTION OF THE DRAWINGS

The invention will be more fully understood by reference to the detailed description, in conjunction with the following figures, wherein:

FIG. 3 is a flow diagram.
FIG. 5 is a flow diagram.

DETAILED DESCRIPTION OF THE INVENTION

Figure 1:
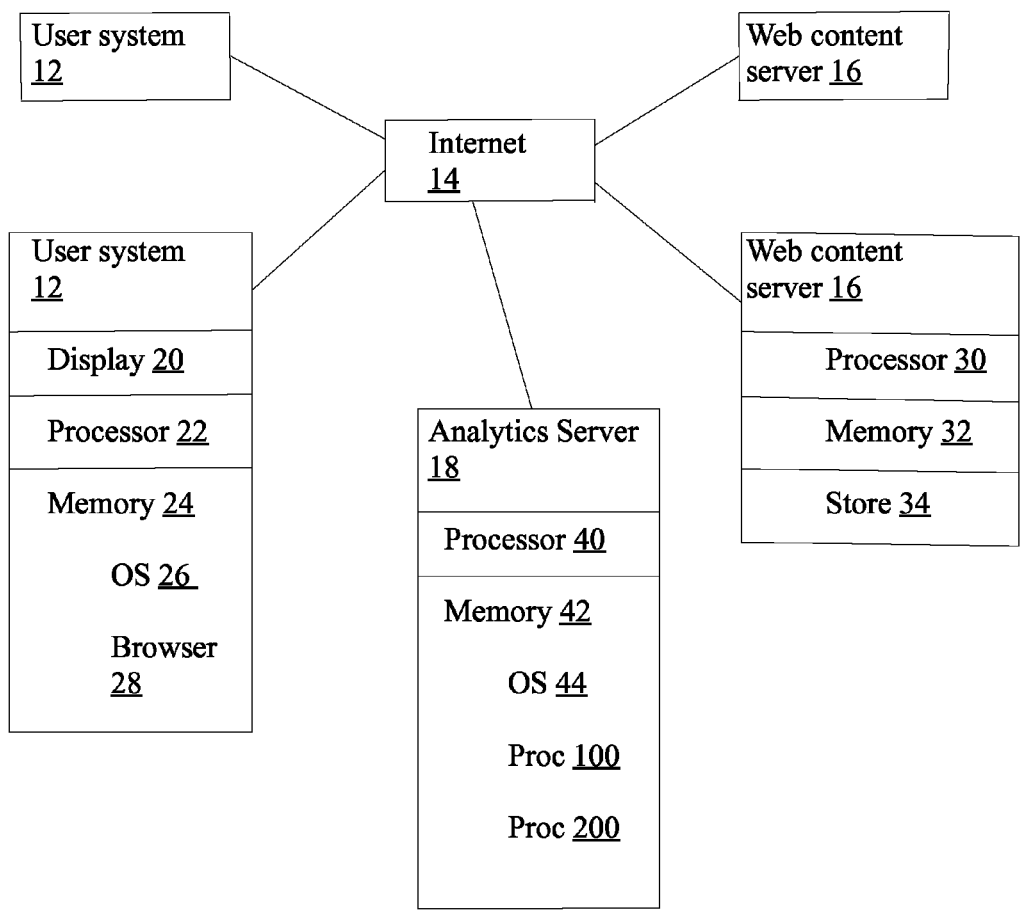
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, a network 10 includes one or more user systems 12 connected to a network of interconnected computers (e.g., the Internet) 14. The network 10 includes one or more web content servers 16 and an analytics server 18 linked to the Internet 14. The one or more user systems 12 can include a display 20, a processor 22, and a memory 24. Memory can include an operating system (OS) 26, such as Windows®, Linux®, Android®, iOS®, and so forth, and a browser 28. The one or more web servers 16 can include a processor 30, a memory 32 and a store 34. The memory 32 can include an OS 36, such as Windows® or Linux®. The store 34, which can be an internal storage device or an external storage device, stores web content. A primary function of the one or more web servers 16 is to deliver the web content on a request to users (i.e., clients) of the one or more user systems 12 using the Hypertext Transfer Protocol (HTTP). Delivery of web content can include text, audio, images, style sheets and scripts, or and combination thereof. Content may include data from offline sources. In some implementations, the one or more web servers track web content requests from the one or more user systems 12, including user information and information about web content delivered to the users.

The analytics server 18 can include processor 40 and a memory 42. The memory 42 can include an OS 44, such as Windows® or Linux®, and a privacy preserving process 100 and a summarizing user data process 200.

Figure 2:
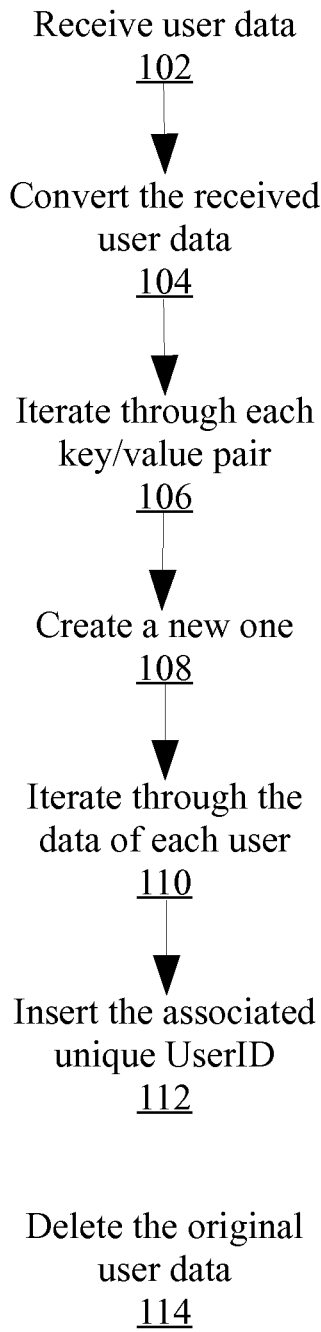
FIG. 2 is a flow diagram.

As shown in FIG. 2, the privacy preserving process 100 includes receiving (102) user data. The user data may be an initial import of all user data, or may be streamed in after user data has been previously loaded.

The privacy preserving process 100 converts (104) the received user data from a relational, document or other form into a set key/value pair per user. For example, a user may have visited a particular website (e.g., giving key/value pair SiteId=1234) and clicked on a particular advertisement (e.g., giving key/value pair CampaignID=ABCD).

The privacy preserving process 100 iterates (106) through each key/value pair for each user. If there is currently no set data structure associated with the given key/value pair, then the privacy preserving process 100 creates (108) a new one. To insure privacy, the data structure conforms to the following properties. First, one should be able to store elements in the set data structure without easily being able to extract the elements out of the structure. In this case, even if the data structures are stolen or subpoenaed, it will be difficult compromise the identity of the users in the set. The second property of the set structure is the ability to perform intersections and/or unions on two or more of the set structures. This property is related to an ability to exploit the stored data to produce summaries. Example data structures are Bloom filters and its variations, MinHash structures, and so forth. In general, a Bloom filter is a simple space-efficient probabilistic data structure for representing a set in order to support membership queries, while MinHash structures are used for quickly estimating how similar two sets are.

In one embodiment, separate data structures are stored for each time scale that might be useful in analysis. For example, a data structure might be created to with SiteID=1234 and VisitDate=6/1/2012, as well as another structure, with SiteID=1234 and VisitMonth=6/2012. The same UserID would be inserted into both of these set data structures. A reporting user could then retrieve summaries for counts of unique users on a particular day, as well as within a particular month (days could not simply be added because a user may visit on more than one day).

The privacy preserving process 100 iterates (110) through the data of each user, and inserts (112) the associated unique UserID into the each of the set data structures given by the user's key/value pairs. For example, if the user had been to SiteID=1234 and clicked on a particular ad with CampaignID=ABCD, his UserID would be inserted into the set data structure for SiteID=1234 as well as into the one for CampaignID=ABCD. In one embodiment, a one time temporary ID is generated and inserted instead of the UserID. In another embodiment, a hash of UserID is stored in the set data structure.

The privacy preserving process 100 optionally may delete (114) the original user data. Once this is done, it is then difficult for any party, authorized or unauthorized, to extract back out individual user information. However, the reporting user is still capable of aggregated analysis.

In one embodiment, a reporting user can express to the privacy preserving process 100 that only sets related to certain keys should be capable of being intersected. When the privacy preserving process 100 is setup with this option, the process 100 creates different classes of set data structures that can be intersected among their respective class, but not across classes. For example, suppose there are three potential keys with user information, SiteID, CampaignID and CreativeID. The reporting user could specify that SiteID/CreativeID can be analyzed together, and CampaignID/CreativeID could be analyzed together, but never SiteID/CreativeID. For each set of exclusive keys, a particular set of hash functions could be used for its set data structures, making it impossible to compare across exclusive classes.

As shown in FIG. 3, the summarizing user data process 200 is a method to leverage the data structures from process 100 to generate summaries. The summarizing user data process 200 receives (202) a list of columns a reporting user would like the summary to contain. The output summary will contain all observed entries for the combinations of values for those columns, along with the number of unique users in each set.

The summarizing user data process 200 iterates (204) through the tags of all of the set data structures, looking for those where the key matches any of the columns requested by the reporting user. For each key, the summarizing user data process 200 gathers (206) a set describing the unique values for that key.

The summarizing user data process 200 calculates (208) all possible combinations of values for each key (e.g. if SiteId has unique values 1234 and 2345, and CampaignID has unique values ABCD and BCDE, this would yield four rows: SiteId=1234, CampaignID=ABCD; SiteID=1234, CampaignID=BCDE; SiteID=2345, CampaignID=ABCD; SiteID=2345, CampaignID=BCDE).

The summarizing user data process 200, for each combination of key/values, looks up (210) the corresponding set data structures (e.g. for SiteId=1234, CampaignID=ABCD, the summarizing user data process 200 will lookup both of those sets). The summarizing user data process 200 intersects (212) these sets, yielding a final count of unique users. This count may be adjusted for sampling or may be subject to additional processing. In one embodiment, the summarizing user data process 200 suppresses summary entries where the counts are below a certain size threshold (or are 0) to reduce the size of the final summaries.

Figure 4:
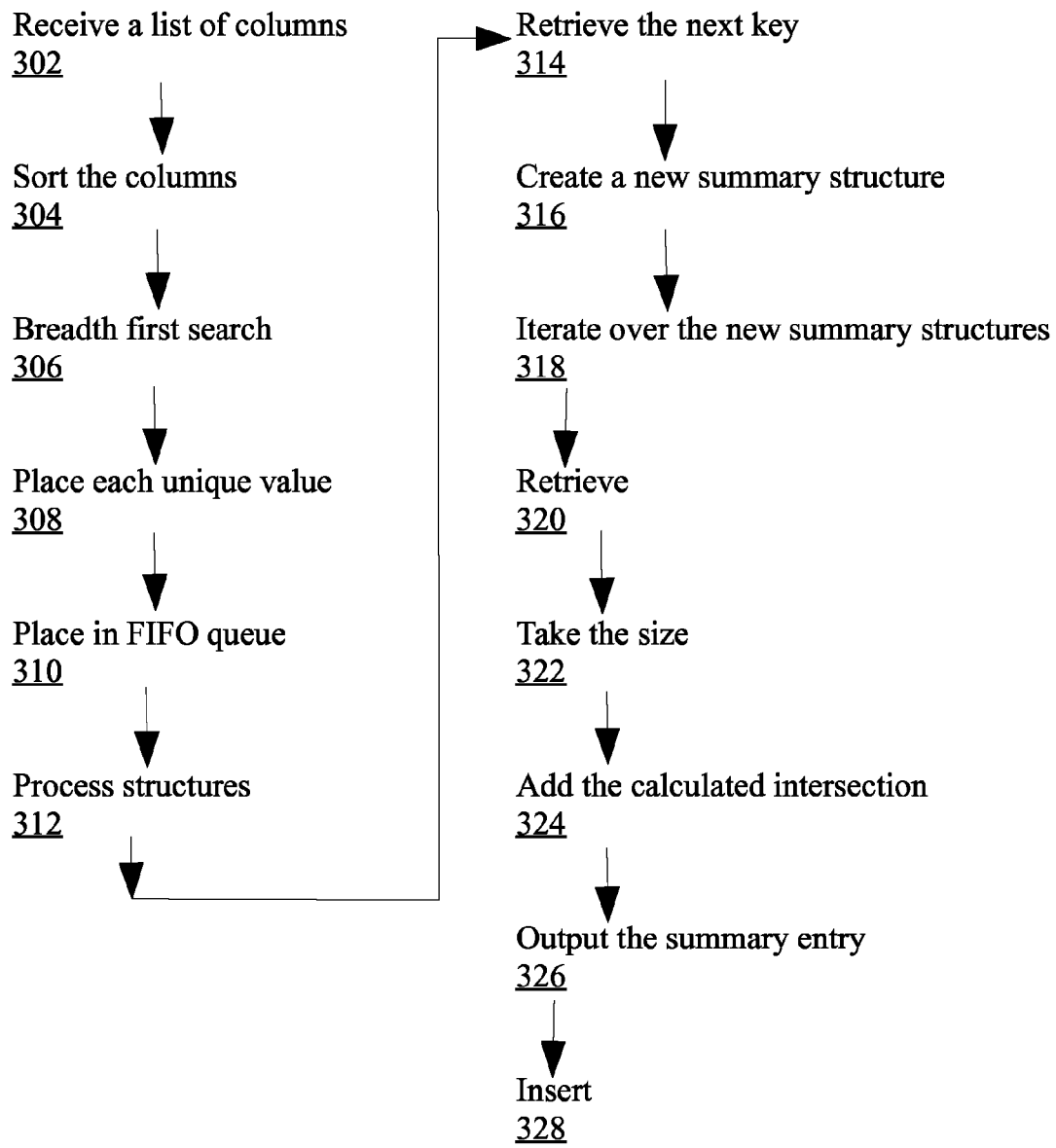
FIG. 4 is a flow diagram.

As shown in FIG. 4, an alternate summarizing user data process 300 provides a potential improvement to the process 200 and includes receiving (302) a list of columns a reporting user would like the summary to contain. This output summary will contain all observed entries for the combinations of values for those columns, along with the number of unique users in each set.

The summarizing user data process 300 includes sorting (304) the columns requested into fixed order and made available as an array of a hash table. The summarizing user data process 300 begins a breadth first search (306) to explore the key/value pair combinations that will be represented in the final summary output. By exploring the space of possible key/value pairs in this way, the summarizing user data process 300 can avoid unnecessarily calculating the intersection of sets for which the size is 0 or below some minimum threshold. This is because when the parent combinations have a size of 0 or below threshold, the same must be true of its children (e.g. if the summary with SiteId=1234, CampaignID=ABCD contains no users, then the summary with SiteId=1234, CampaignID=ABCD, Clicked=Y cannot contain any more users). When the summarizing user data process 300 knows the parent is below threshold, it does not bother to calculate the sizes for the children combinations.

The summarizing user data process 300 places (308) each unique value for the first key into a new data structure representing a summary entry. These summary entries structures are then placed (310) in a first-in, first-out (FIFO) queue. The summarizing user data process 300 begins a loop where it processes (312) structures off of the queue until the queue is empty. For each structure that is popped off of the queue, a number of new structures are created. The summarizing user data process 300 then looks for the last key in the summary entry structure (e.g. SiteID). The summarizing user data process 300 then uses the list of keys made to retrieve (314) the next key in sorted order. The summarizing user data process 300 creates (316) a new summary structure for each value of the new key, after copying over the structure from the previously popped element. For example, if the popped summary structure contained SiteID=1234, and the key CampaignID takes on the unique values ABCD and BCDE, then this step of the algorithm will create 2 summary structures, one with SiteID=1234, CampaignID=ABCD and one with SiteID=1234, CampaignID=BCDE.

The summarizing user data process 300 iterates (318) over the new summary structures. For each key/value pair in the summary structure, the summarizing user data process 300 retrieves (320) the associated set data structures. The summarizing user data process 300 then takes the size (322) of the intersection of all of these data structures. If the intersection size is not 0, and the summary structure represents a complete summary with all of the keys corresponding to the columns requested by the reporting user, then summarizing user data process 300 adds (324) the calculated intersection cardinality to the structure, and outputs (326) the summary entry (e.g. if the reporting user requested a summary of SiteID and CampaignID, and the summary entry structure contains both of those). If the intersection size is not 0, and the summary structure is not complete, the summarizing user data process 300 inserts (328) this summary structure back into the queue.

As described above in process 100, 200 and 300, information about users is stored with a reference to a unique user id (UserID). This UserID can be generated randomly one time for each user, or it can be a unique id already commonly associated with the user. It can also be a hashed version of an existing id. Records and events about this user are stored on an analytics server. A UserID can include a cookie set locally by the client or the server, a web browser fingerprint (some combination information about the browser, IP address and geography), an online ID (a web account username) or an offline ID (name, address, account number of some other alphanumeric identifier).

Information about users is converted to a form of key/value pairs. For instance, a user may have visited a particular website (giving key/value pair SiteId=1234) and clicked on a particular ad (giving key/value pair CampaignId=ABCD).

As data is initially imported or continues to come into the analytics server, the previously generated key/value attributes are created as buckets, labeled with their respective key/value pair. These buckets are set data structures, such as Bloom filters, Minhashes, and so forth, that are capable of storing sets of ids. One important aspect of these set data structures is that as they help conceal the UserIDs which have been stored in them. The data structures are arranged in such a way as to make it difficult to extract the UserIDs. The privacy preserving process 100 may persist the set data structures to permanent storage (e.g. hard disk) on the analytics server or another server. It may also cache the set data structures in memory, or parts of the set structures, according to some usage metrics. This caching can help the to increase the speed of inserting UserIDs into frequently used sets, while allowing the total size of the set data structures to be larger than available memory.

Another property of the data structures used (again, typically Bloom filters or variations) is that they can be intersected together to determine the size of the overlap between the two sets they represent. This fact is exploited to compute summaries of the data. In the previous example it enables calculation of the number of users who saw SiteID=1234 and saw the ad CampaignId=ABCD. By finding combinations of key/value pairs and then calculating those set intersections, a reporting is able to build a full set of summaries on the data, with immediate business value.

In one embodiment, illustrated in FIG. 5, the privacy preserving process 500 manages a simple collection of the set data structures to assist in online to offline record linkage and data correction. The data analyzed in this case may consist of relational data as well as data directly streamed in from server requests and logs. To estimate the overlap between a changing online web browser property (e.g. an ID set through a cookie) and some persistent ID in aggregate (e.g. an online or offline user name), the privacy preserving process creates two sets (e.g. a Bloom filter) 502, one for frequently changing information, and the other for persistent IDs. A collection of sets may be created to analyze the overlap by additional properties of the web browser (e.g. browser type) to estimate the unique ID ratio at a more granular level (e.g. show the number of unique cookies set broken down by different types of browsers). When user data with more than one available UserID is received (e.g. a cookie as well as a user login) 504, each type of UserID is inserted into an independent Bloom filter. This technique can be used for estimating the cookie deletion rate of different types of browsers by estimating the cardinality of the sets for each type of UserID 506, and then using the ratio of cardinalities to correct previously computed and stored reports with frequently changing UserIDs (e.g. cookies) 508. This technique allows more accurate calculation of unique users in applications where only the frequently changing UserIDs are available, while still preserving the privacy of the users whose data make up the estimates.

Figure 6:
FIG. 6 is a flow diagram.
Figure 6:
Figure 6:
Figure 6:
Figure 6:

In one embodiment, illustrated in FIG. 6, users can also opt-out of this analytical process 600 while still preserving the privacy of their underlying UserIDs. Opting-out allows the user to specify that he does not wish to be included in the analytics generated by the server. In this embodiment, all of the key/value data sets used in all of the analytics use a counting Bloom filter, which allows the deletion of elements after insertion, again without allowing the extraction of plaintext UserIDs from the data structure. First an additional Bloom filter data structure is created to store opt-out events 602. Users can then signify through a web form or similar means that they do not wish for their UserID to be included in any further analytics, at which point the server receives the UserID to be opted-out 604. The UserID is inserted into the opt-out Bloom filter 606. The server then performs a remove operation on the key/value Bloom filters using the UserID 608. When the server receives new user data 610, the server first checks to see if the user is in the opt-out set. If the user is in the set, his data is discarded instead of processed. This process allows the user to control his own data, without having his UserID continuously stored in plaintext.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method of preparing data corresponding to a plurality of users for anonymous analysis comprising:
   receiving the data into a memory of a server;
   for each user of the plurality of users, converting the received data into a plurality of key/value pairs, forming a set of user-key/value pairs;
   generating a new data structure in the memory of the server for each key/value pair for which no data structure is associated;
   for each user of the plurality of users, inserting a UserID associated with the user into the data structure associated with each of the key/value pairs in the set of user-key/value pairs;
   storing the data structure associated with each of the key/value pairs as a prepared data set;
   deleting the received data; and
   providing access to the prepared data set for anonymous analysis.

2. The method of claim 1 wherein the received data is a relational document.

3. The method of claim 1 wherein the new data structure is a Bloom filter data structure.

4. The method claim 1 wherein the new data structure is a Minhash data structure.

5. The method of claim 1 wherein generating the new data structure comprises generating plural data structures corresponding to times on a time scale.

6. The method of claim 1 further comprising:
   receiving a set of columns requested for a summary, during the providing access;
   querying labels of the data structures of the prepared data set for unique values for each column; and
   calculating all combinations of the unique values across columns to form the requested summary.

7. The method of claim 6 further comprising, for each combination of key value pairs, looking up the corresponding set of data structures, intersecting those sets to find a size, and outputting a summary entry with that size for each combination.

8. The method of claim 1 further comprising:
   receiving a set of columns requested for a summary; and
   sorting the set of columns into a fixed order.

9. The method of claim 8 further comprising placing each value for a first key into a new data structure representing a summary entry.

10. The method of claim 9 further comprising placing each of the data structures into a first-in-first-out (FIFO) candidate queue.

11. The method of claim 10 further comprising:
    taking summary structures off of the candidate queue;
    getting the last key in the structure, and using it to look up the next key; and
    creating a number of new structures equivalent to the number of values in the next key.

12. The method of claim 11 further comprising:
    iterating over the new summary structures;
    for each key/value pair in the summary structure, retrieving the associated set of data structures; and
    intersecting all of the data structures.

13. The method of claim 12 further comprising:
    if the intersection size is not 0, adding a calculated intersection cardinality to the structure; and outputting the summary entry.

14. The method of claim 12 further comprising: if the intersection size is not 0 and the summary structure is not complete, adding this summary structure back to the FIFO candidate queue.

15. The method of claim 1 further comprising:
creating multiple sets of data structures for different types of UserID;
estimating the cardinality of each of the data structures; and
using a ratio of cardinalities to correct unique user estimates for users who frequently change UserID.

16. The method of claim 1, wherein the data structures of the prepared data set include counting Bloom filters capable of having elements removed, the method further comprising:
creating a new Bloom filter data structure for storing a UserID for a user who opts out of analysis;
adding a UserID of the user who opts out of analysis to the new Bloom filter data structure;
destroying any future data that comes into the server for the added UserID before the data can be included in analysis; and
removing the UserID of the user who opts out of analysis from the counting Bloom filters of the key/value sets.

17. A method of preventing access by an analytics process to sensitive data corresponding to a plurality of users comprising:
receiving the data into a memory of a server;
for each user of the plurality of users, converting the received data into a plurality of key/value pairs, forming a set of user-key/value pairs;
generating a new data structure in the memory of the server for each key/value pair for which no data structure is associated;
for each user of the plurality of users, inserting a UserID associated with the user into the data structure associated with each of the key/value pairs in the set of user-key/value pairs;
storing the data structure associated with each of the key/value pairs as a prepared data set; and
deleting the received sensitive data, thereby preventing access by the analytics process to the received sensitive data.

18. The method of claim 17 wherein the received data is a relational document.

19. The method of claim 17 wherein the new data structure is a Bloom filter data structure.

20. The method claim 17 wherein the new data structure is a Minhash data structure.

21. The method of claim 17 wherein generating the new data structure comprises generating plural data structures corresponding to times on a time scale.

22. The method of claim 17 further comprising:
receiving a set of columns requested for a summary;
querying labels of the data structures of the prepared data set for unique values for each column; and
calculating all combinations of the unique values across columns to form the requested summary.

23. The method of claim 22 further comprising, for each combination of key/value pairs, looking up the corresponding set of data structures, intersecting those sets to find a size, and outputting a summary entry with that size for each combination.

24. The method of claim 17 further comprising:
receiving a set of columns requested for a summary; and
sorting the set of columns into a fixed order.

25. The method of claim 24 further comprising placing each value for a first key into a new data structure representing a summary entry.

26. The method of claim 25 further comprising placing each of the data structures into a first-in-first-out (FIFO) candidate queue.

27. The method of claim 26 further comprising:
taking summary structures off of the candidate queue;
getting the last key in the structure, and using it to look up the next key; and
creating a number of new structures equivalent to the number of values in the next key.

28. The method of claim 27 further comprising:
iterating over the new summary structures;
for each key/value pair in the summary structure, retrieving the associated set of data structures; and
intersecting all of the data structures.

29. The method of claim 28 further comprising:
if the intersection size is not 0, adding a calculated intersection cardinality to the structure; and
outputting the summary entry.

30. The method of claim 28 further comprising:
if the intersection size is not 0 and the summary structure is not complete, adding this summary structure back to the FIFO candidate queue.

31. The method of claim 17 further comprising:
creating multiple sets of data structures for different types of UserID;
estimating the cardinality of each of the data structures; and
using a ratio of cardinalities to correct unique user estimates for users who frequently change UserID.

32. The method of claim 17, wherein the key/value sets of the prepared data set include counting Bloom filters capable of having elements removed, the method further comprising:
creating a new Bloom filter data structure for storing a UserID for a user who opts out of analysis;
adding a UserID of the user who opts out of analysis to the new Bloom filter data structure;
destroying any future data that comes into the server for the added UserID before the data can be included in analysis; and
removing the UserID of the user who opts out of analysis from the counting Bloom filters of the key/value sets.

33. A method of evaluating the effectiveness of an advertisement without reference to identifying information in data corresponding to a plurality of users comprising:
receiving data comprising information responsive to the advertisement into a memory of a server;
for each user of the plurality of users, converting the received data into a plurality of key/value pairs, forming a set of user-key/value pairs;
generating a new data structure in the memory of the server for each key/value pair for which no data structure is associated;
for each user of the plurality of users, inserting a UserID associated with the user into the data structure associated with each of the key/value pairs in the set of user-key/value pairs;
storing the data structure associated with each of the key/value pairs as a prepared data set;
deleting the received data; and
evaluating the prepared data set without reference to identifying information the received data.

34. The method of claim 33 wherein the received data is a relational document.

35. The method of claim 33 wherein the new data structure is a Bloom filter data structure.

36. The method claim 33 wherein the new data structure is a Minhash data structure.

37. The method of claim 33 wherein generating the new data structure comprises generating plural data structures corresponding to times on a time scale.

38. The method of claim 33 further comprising:
receiving a set of columns requested for a summary;
querying labels of the data structures of the prepared data set for unique values for each column; and
calculating all combinations of the unique values across columns to form the requested summary.

39. The method of claim 38 further comprising, for each combination of key/value pairs, looking up the corresponding set of data structures, intersecting those sets to find a size, and outputting a summary entry with that size for each combination.

40. The method of claim 33 further comprising:
receiving a set of columns requested for a summary; and
sorting the set of columns into a fixed order.

41. The method of claim 40 further comprising placing each value for a first key into a new data structure representing a summary entry.

42. The method of claim 41 further comprising placing each of the data structures into a first-in-first-out (FIFO) candidate queue.

43. The method of claim 42 further comprising:
taking summary structures off of the candidate queue; getting the last key in the structure, and using it to look up the next key; and
creating a number of new structures equivalent to the number of values in the next key.

44. The method of claim 43 further comprising:
iterating over the new summary structures; for each key/value pair in the summary structure, retrieving the associated set of data structures; and
intersecting all of the data structures.

45. The method of claim 44 further comprising:
if the intersection size is not 0, adding a calculated intersection cardinality to the structure; and outputting the summary entry.

46. The method of claim 44 further comprising:
if the intersection size is not 0 and the summary structure is not complete, adding this summary structure back to the FIFO candidate queue.

47. The method of claim 33 further comprising:
creating multiple sets of data structures for different types of UserID;
estimating the cardinality of each of the data structures; and
using a ratio of cardinalities to correct unique user estimates for users who frequently change UserID.

48. The method of claim 33, wherein the key/value sets of the prepared data set include counting Bloom filters capable of having elements removed, the method further comprising:
creating a new Bloom filter data structure for storing a UserID for a user who opts out of analysis;
adding a UserID of the user who opts out of analysis to the new Bloom filter data structure;
destroying any future data that comes into the server for the added UserID before the data can be included in analysis; and
removing the UserID of the user who opts out of analysis from the counting Bloom filters of the key/value sets.

49. The method of claim 1, wherein for each user of the plurality of users, the userID associated with the user is generated randomly.

50. The method of claim 1, wherein for each user of the plurality of users, the userID associated with the user is a unique identifier previously associated with the user.

51. The method of claim 1, wherein for each user of the plurality of users, the userID associated with the user is a hashed version of an existing identifier.

52. The method of claim 1, wherein for each user of the plurality of users, the userID associated with the user includes at least one of: a cookie set locally by a client or server; a web browser fingerprint; an online ID; and an offline ID.

53. The method of claim 1, wherein data is continually being received.

54. A method for summarizing user data, the method comprising:
receiving a prepared data set prepared for anonymous analysis according to the method of claim 1;
receiving a list of columns to be reported, wherein the columns in the list of columns correspond to keys of the key/value pairs of the prepared data set;
determining a set of keys, wherein each key corresponds to one of the columns in the list of columns;
determining a set of unique values for each key in the set of keys;
generating all combinations of key/value pairs from the set of keys and set of unique values for each key; and
for each combination of the generated combinations, intersecting the data structures corresponding to the key/value pairs to generate a final count of unique users.

55. The method of claim 54, further comprising suppressing summary entries where the counts are below a threshold value.

56. A method for summarizing user data, the method comprising:
receiving a prepared data set prepared for anonymous analysis according to the method of claim 1;
receiving a list of columns to be reported, wherein the columns in the list of columns correspond to keys of the key/value pairs of the prepared data set;
sorting the columns into a fixed order;
determining a set of unique values for the key corresponding to the first column in the sorted columns;
initializing a first-in-first-out (FIFO) candidate queue with summary entry structures, wherein the summary entry structures comprise key/value pairs for each of the values of the set of unique values and each summary entry structure comprises a last key, the last key being the key corresponding to the first column in the sorted columns; and
while the candidate queue is non-empty:
removing a summary entry structure off the candidate queue;
determining if a next key exists, wherein the next key is the key corresponding to the column immediately following the column corresponding to the last key of the summary entry structure in the set sorted columns;
in response to determining that a next key exists:
determining a set of unique values for the next key; and
creating a new summary entry structure for each unique value of the set of unique values, the new summary entry structure comprising the key/value pair corresponding to the determined next key and the unique value and the key/value pairs of the removed summary entry structure and wherein the last key of the new summary entry structure is the next key;

for each new summary entry structure, determining a cardinality of the intersection of the data structures corresponding to each of the key/value pairs in the new summary entry structure;

for each new summary entry structure for which the determined cardinality is nonzero, determining if the summary entry structure contains keys corresponding to each column in the list of columns;

for each new summary entry structure for which the determined cardinality is nonzero, in response to determining that the summary entry structure contains keys corresponding to each column in the list of columns, outputting the summary entry structure; and for each new summary entry structure for which the determined cardinality is nonzero, in response to determining that the summary entry structure does not contain keys corresponding to each column in the list of columns, inserting the new summary entry structure into the candidate queue.

* * * * *